Aug. 2, 1955
F. TRINCA
2,714,636
TIRE UNDERINFLATION OR OVERINFLATION WARNING SYSTEMS
Filed March 31, 1952
3 Sheets-Sheet 1
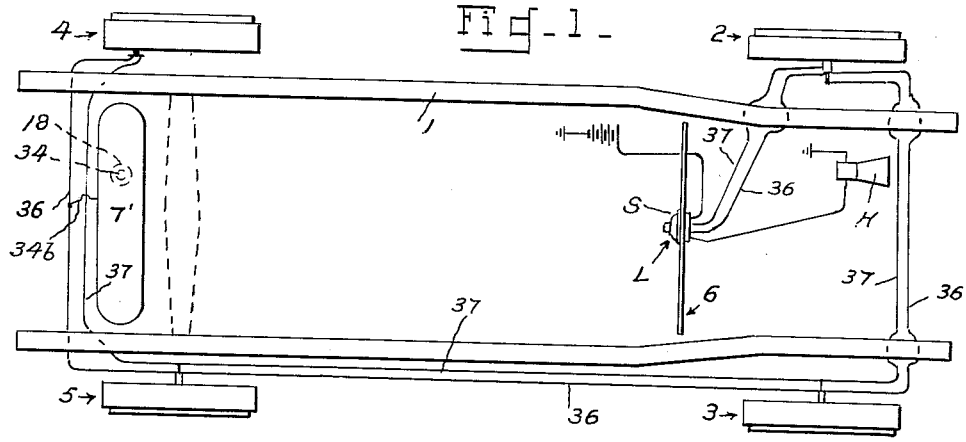
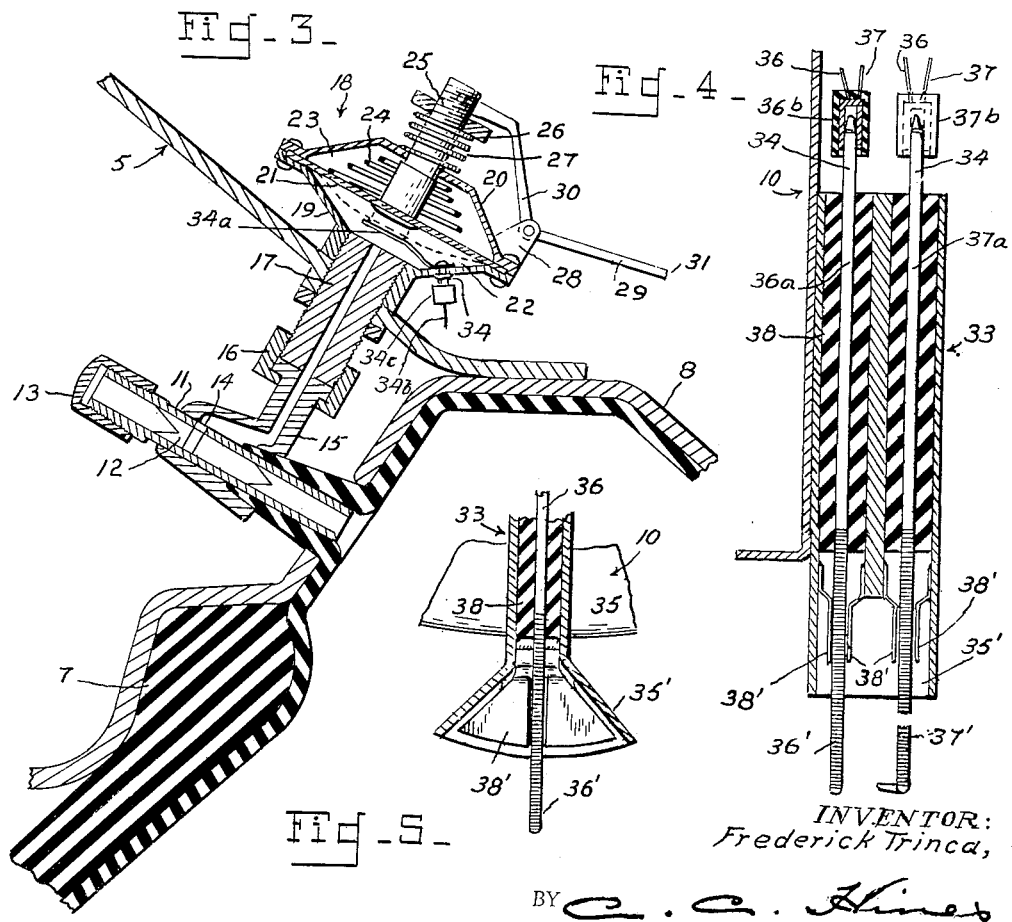
INVENTOR:
Frederick Trinca,
BY C. C. Hines,
ATTORNEY.

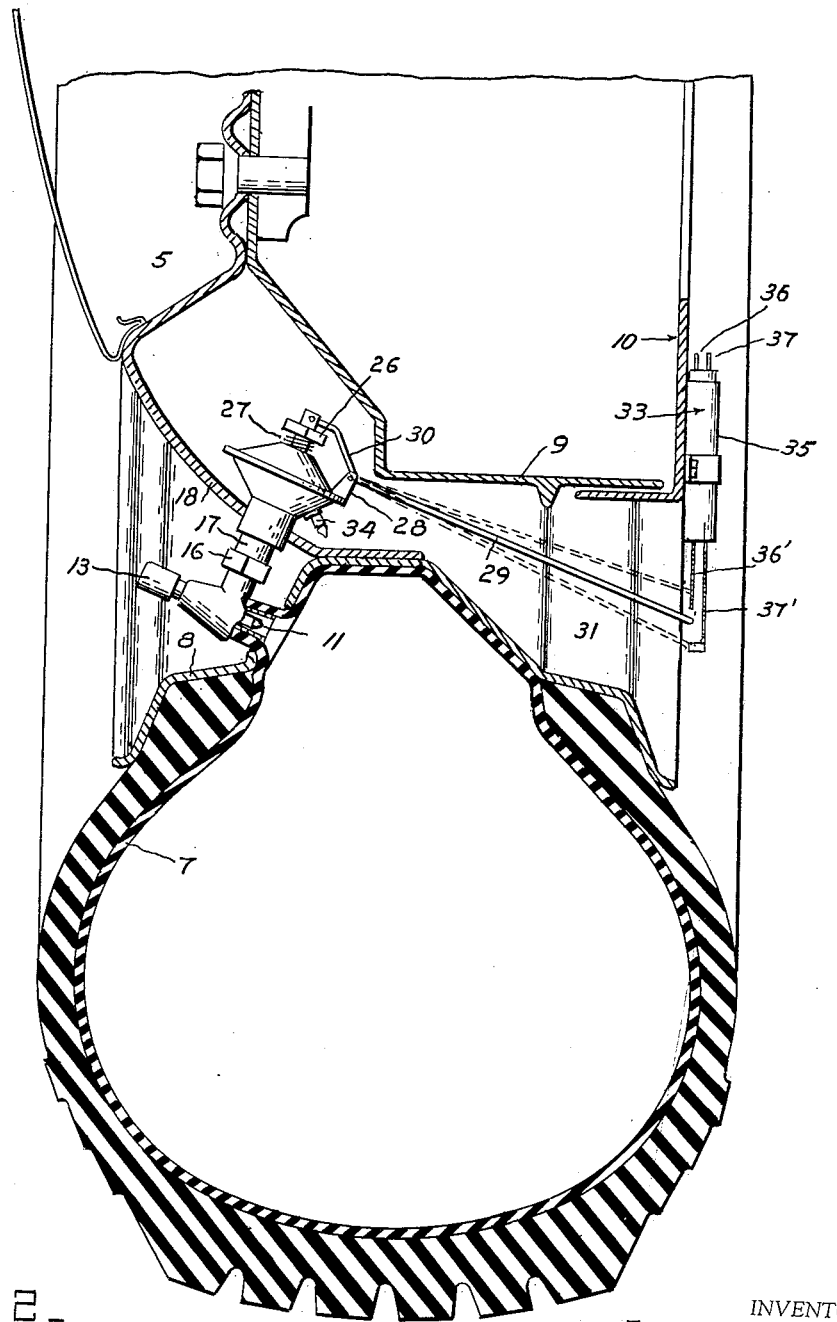
Fig-2-

Aug. 2, 1955  F. TRINCA  2,714,636
TIRE UNDERINFLATION OR OVERINFLATION WARNING SYSTEMS
Filed March 31, 1952  3 Sheets-Sheet 3
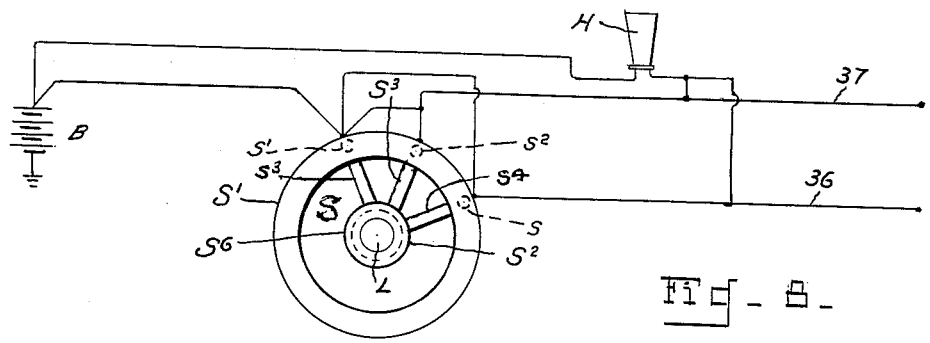
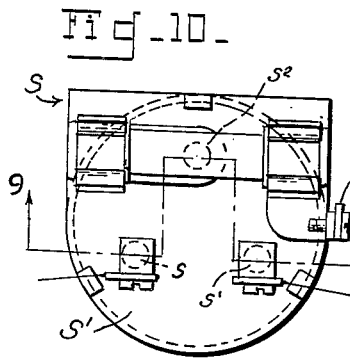
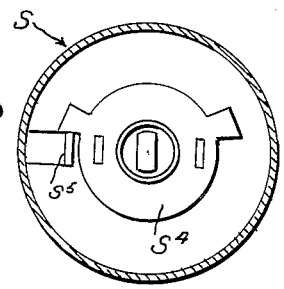
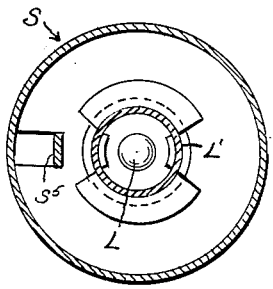
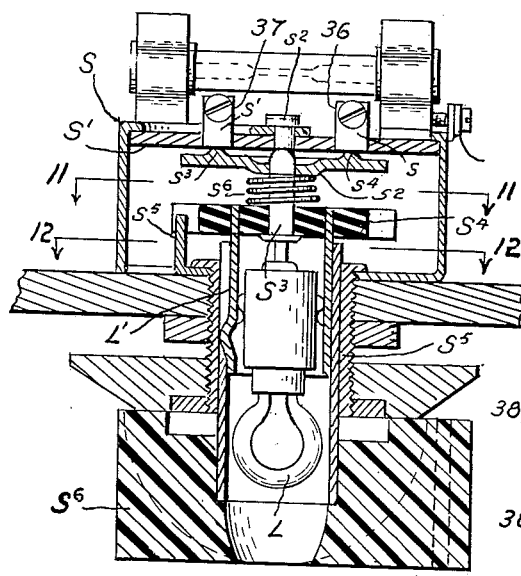
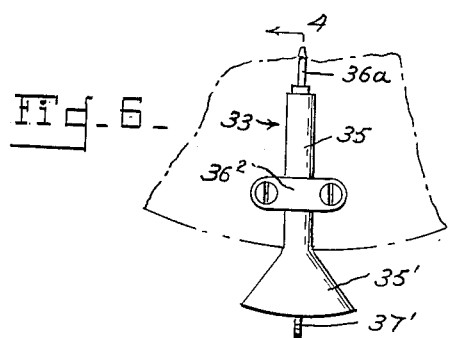
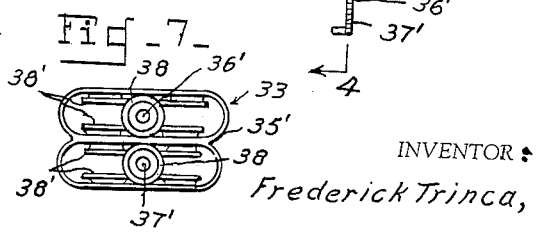
INVENTOR:
Frederick Trinca,
BY C. C. Hines,
ATTORNEY.

United States Patent Office 2,714,636
Patented Aug. 2, 1955

2,714,636

TIRE UNDERINFLATION OR OVERINFLATION WARNING SYSTEMS

Frederick Trinca, Middle Village, N. Y.

Application March 31, 1952, Serial No. 279,627

3 Claims. (Cl. 200—61.25)

This invention relates to pressure indicating means for use on automobiles, trucks, aeroplanes, or other vehicles having wheels equipped with pneumatic tires for giving an alarm or warning signal, which may be an audible signal, a visual signal, or both, to apprise the driver when the vehicle is in motion of any loss or increase of air pressure, below or above a preselected pressure, which occurs in any or all of the tires on the wheels of the vehicle, so that the driver may take measures to correct the fault in time to avoid blow-outs and possible accidents as well as injury to the tires. The invention is also designed to give a warning signal in the event of the loss of pressure in any spare tire or tires carried by the vehicle, which feature may be used for the convenience of the driver, or not, at his option, but may be employed without interference with the signals given to indicate overinflation or underinflation of the tires in use on the vehicle wheels.

The primary object of the invention is to provide signalling or warning means of the character described which is simple of construction, reliable and efficient in action, economical in installation and maintenance, and adapted to be readily applied to any vehicle without altering in any manner the construction of any parts of the vehicle.

A further object of the invention is to provide means of this character which will operate without appreciable wear on or injury to the tires or any other parts of the vehicle, and which will operate in either the forward or backward travel of the vehicle.

With these and other objects in which, will appear in the course of the subjoined description, the invention consists of the novel features of construction, combination and arrangement of parts hereinafter more fully set forth and claimed, and as shown in the accompanying drawings, in which:

Figure 1 is a diagrammatic plan view of the frame, wheels and instrument panel or board of the vehicle, showing the application of the invention thereto.

Figure 2 is a vertical transverse section on an enlarged scale through a portion of one of the wheels and its brake drum, and a pneumatic tire mounted on the wheel, together with a switch actuator mounted on the wheel rim and a coacting circuit closing switch mounted on the back plate of the brake drum.

Figure 3 is a sectional view through parts shown in Figure 2 on a further enlarged scale.

Figure 4 is a longitudinal section through the circuit closing switch mounted on the back plate of the drum.

Figure 5 is a section through a part of said switch taken at right angles to that shown in Figure 4.

Figure 6 is a view in elevation of the back plate and switch shown in Figures 4 and 5, looking in the direction of the arrows shown in Figure 2.

Figure 7 is a view looking toward the flared end of the switch shown in Figures 4 to 6, inclusive.

Figure 8 is a diagrammatic view of parts of the signal circuit and the manually operable cut out switch mounted on the instrument board.

Figure 9 is an enlarged sectional view through the instrument board and the manually operable cut out switch.

Figure 10 is a view in rear elevation of the cut out switch.

Figures 11 and 12 are sections taken on lines 11—11 and 12—12 of Figure 9.

Referring now more particularly to the drawings, 1 designates the frame, 2—3 the front wheels, 4—5 the rear wheels, and 6 the instrument board or panel of the automobile, on each of which wheels a pneumatic tire 7 of conventional type is mounted. As shown, the tire 7 is mounted on a conventional channeled rim 8, and each wheel is or may be provided in practice with the usual brake drum 9 which is fixed thereto and closed at its inner side by the usual cover or back plate 10 mounted on the wheel axle housing. Figure 1 also shows a spare tire 7' which may be mounted on a suitable carrier or support at the rear or any other suitable point on the machine.

Each wheel tire 7 is provided with an inflating and deflating tube or stem 11 in which is enclosed the usual valve means, the valve pin 12 only of which is shown, together with its closure cap 13, said tube or stem being of conventional type except as to the formation therein of an opening 14 for the connection and communication therewith of a coupling elbow 15 which is suitably fastened thereto and which is designed to be coupled by means of a coupling collar 16 to the stem 17 of a pressure controlled switch actuating device 18 secured to a body part of the wheel carrying the rim 8 and which is accordingly fixed to the wheel to rotate therewith.

The pressure controlled or operated switch actuating device comprises a diaphragm shell or housing formed of relatively outer and inner sections 19 and 20 which are suitably united and clamp between them the marginal portion of a flexible diaphragm 21. This diaphragm divides the housing into two chambers 22 and 23. The chamber 22 is normally in communication through the stems 17 and 11 with the air space in the tire so that the diaphragm is exposed on its side facing the chamber 22 to the pressure of the air in the tire. This pressure is opposed by a spring 24 arranged in the chamber 23 so that the diaphragm is maintained in its normal position shown in full lines as long as the pressure in the tire remains at the preselected pressure. If, however, the tire pressure should fall below the preselected pressure the diaphragm, under the predominant pressure of the spring 24, will move downward in the chamber 22, while if the pressure in the tire should be excessive or above the preselected pressure the diaphragm will move upward in the chamber 23 against the yielding resistance of the spring 24. The arrangement of the parts is, however, such that the diaphragm may have a certain range of movement in either direction under unimportant variations of pressure in the tire due to road shocks or heat expansion of the air without operating the signaling means to give a faulty signal.

Attached to the diaphragm is a plunger stem 25 which projects outward through an opening in the crown of the housing section 20 which is threaded at its outer end to receive an abutment and adjusting nut 26. Between this nut and the crown of the casing section 20 is disposed a second spring 27 which exerts pressure in opposition to the spring 24 and coacts with the tire pressure to hold the diaphragm in normal position as long as normal pressure in the tire exists, but supplements the tire pressure and exerts its force on the plunger 25 to move the diaphragm upward into chamber 23 and cause the plunger to move outward when the tire is overinflated, or the pressure of the air is excessive and materially above the preselected pressure. The housing section 20 is provided with a bracket lug 28 to which is pivoted a bell crank type of switch actuating lever 29 having a short arm 30 pivoted to the outer end of the plunger 25 and a longer arm 31 projecting toward and beyond the inner side of the wheel between the brake drum and back plate for cooperation with a circuit controlling switch 33 to operate and cause the switch to close the circuit to give a warning signal when the tire loses pressure and becomes underinflated or when the tire is overinflated. Attached to and insulated from the housing section 20 is a conductor supporting stem or post 34 to which is attached a contact piece 34$^a$, for a purpose hereinafter described.

The circuit controlling switch 33 comprises a housing 35 of conducting material which is secured by a clamp 36$^2$ or other suitable fastening means to the inner face of the back plate 10 and is arranged radially of the wheel or at right angles to the wheel axle with its outer end 35' projecting beyond the back plate toward the inner side of the rim. This end of the housing 35 is flared and flattened to an elongated elliptical shape with its major axis lying parallel with the vehicle frame and at right angles to the wheel axis. Extending longitudinally of the frame are conductors 36, 37 and enclosed within each switch housing 35 are contact leads 36$^a$, 37$^a$ which are each insulated from the housing and from each other by an insulated lining 38. These leads are connected in the housing to contacts 36', 37' which project outwardly to different degrees through the flared end 35' of the housing in position to be engaged by the arm 31 of the associated switch actuating lever on rotation of the wheel when said arm is moved into position for engagement therewith. Each contact 36', 37' is arranged to lie normally in a neutral position between the spaced inner ends of pairs of contact and guide plates 38' connected with the housing. Normally the arm 31, in a properly inflated condition of the tire, lies between and out of engagement with both contacts 36', 37'. When, however, the pressure diaphragm moves downwardly, responsive to an underinflated condition of the tire, arm 31 is shifted to a position to engage the contact 36', while, when the diaphragm moves upwardly, responsive to an overinflated condition of the tire, arm 31 will be shifted into position to engage the contact 37'. Each of these contacts is of flexible character and preferably formed of a coiled spring of suitable relative stiffness and flexibility and welded or otherwise fixed at its inner end to its conductor and normally arranged centrally of the housing portion 35' in a neutral position in which it is out of contact with the plates 38' and the housing. Each contact is normally maintained in such position by its inherent resiliency but is adapted when engaged by the arm to be swung in either direction for contact with the plates 38' at one end or the other of the housing portion 35' according to the direction of rotation of the wheel. Thus whether the vehicle wheel is rotating either forwardly or backwardly in the travel of the vehicle, the contact 36' or 37' will be moved to make electrical connection between the conductor 36 or 37 and the housing to close or complete the electric signal circuit at the wheel point to cause said circuit to operate a warning signal to notify the driver that the tire is either underinflated or overinflated, according to the direction of motion of the diaphragm.

The conductors 36, 37 are continuous and provided with coupling plugs or sockets 36$^b$, 37$^b$ to connect them with the upper ends of the leads 36$^a$, 37$^a$ at the wheel points. Conductor 36 is also provided with a branch 34$^b$ having a coupling plug or socket 34$^c$ to engage the stem or part 34 on the housing of the diaphragm chamber of the switch actuating device 18 mounted on the wheel frame of the tire 7' being carried as a spare tire.

The conductors 36 and 37 and switch devices associated with the wheels form part of an electric signal or indicating circuit including an aural or visual signal device, or both, and adapted to be closed by any of the switch devices to cause a warning signal to be given, during the running of the vehicle, whenever a wheel tire is underinflated or overinflated, as well as to give a warning signal, if desired, when a carried spare tire becomes underinflated. The circuit also includes a battery B, which may be the usual ignition battery or an auxiliary battery, for energizing the aural signal or the visual signal, or both, whenever the circuit is closed by one or more of the switch devices. The aural signal device employed may be a horn H, which may be the usual signal horn or a buzzer or other aural signal device, and the visual signal device may be a lamp L or other visual indicator, which signal devices may be mounted on or in the region of the instrument board. In addition to the pressure controlled switch devices above described for momentarily and periodically closing the signal circuit at the wheel points, as a wheel revolves in the case of an overinflation or underinflation of its tire, I also preferably provide upon the instrument panel a manually operable switch device for making or breaking the circuit at that point, so that the circuit may be set for action or cut out of action, as desired. When it is desired to adapt the system to also indicate an underinflated condition of a spare tire, the actuator 18 is provided with the connection part 34 and contact 34$^a$ and the conductor 36 is provided with a branch 34$^b$ and a connection plug 34$^c$ to connect it with the part 34. The contact plate 34$^a$ lies in the path of a head 34' at the end of the plunger connected with the diaphragm, so that when the diaphragm collapses or is depressed to the dotted line position shown in Fig. 3, due to an underinflated condition of the tire, a circuit from the plus side of a battery B through a closed switch S will be completed through conductor 36, connection 34$^b$, contact 34$^a$ and plunger 25 and actuator shell 20 to ground to operate a warning signal device or devices hereinafter described.

As shown in the present instance, the conductors 36 and 37 are continuous and provide low and high pressure indicating lines which respectively connect the sets of contacts 36' and 37' with contacts $s$, $s'$ and $s^2$ on a stationary disk S' of insulated material forming part of the panel switch S, with which conductors 36 and 37 and contacts $s$, $s'$, $s^2$ are also connected with conductors leading to and from the battery B and horn H for flow of current from the positive side of the battery through either conductor 36 or 37 where a circuit is completed by actuation of an associated switch by its actuator, through which the actuating current passes to ground. The switch S has a movable member of conducting material in the form of an oscillatory disk $S^2$ and which is mounted to slide upon and intake with a shaft $S^3$. The disk $S^2$ is provided with contact portions $s^3$, $s^4$ to engage the contacts $s$, $s'$ when the shaft is turned to a certain degree in one direction, and through an opening in this disk projects the forward end of the shaft $S^3$ which is arranged to engage the contact $s^2$. Fixed to the shaft $S^3$ to rotate therewith is a disk $S^4$ of insulating material which is carried by the lamp receiving socket to which is fitted in a housing sleeve or tube $S^5$ secured to the instrument board or panel 6. The disk $S^4$ is notched or winged for engagement with a fixed stop $s^5$ to limit the oscillating movements of the parts $S^2$, $S^3$, $S^4$, between switch "off" and "on" positions. Shaft $S^3$ has its rear end arranged to engage the center contact of the lamp fitted in the socket to conductively connect it in circuit with the battery when its forward end engages the contact $s^2$ on the switch being turned to "on" position. Disposed about the shaft $S^3$ between the disks $S^2$ and $S^3$ is a spring $s^6$ which holds the disk $S^2$ pressed against the disk S' and the contacts in firm engagement when engaged. A hollow knob section $S^6$ is rotatably mounted in the housing tube $S^5$ and detachably connected with the lamp socket and is arranged on the panel so as to conveniently be reached and operated to turn the switch to "on" and "off" positions. The knob which partly encloses the lamp may be of transparent or translucent material or provided with an opening, as shown, through which the light from the lamp may shine when the lamp glows or flashes to give a visual signal.

It will be evident from the foregoing that by means of the switch S the driver may set the signal circuit in condition for action or cut it out of action at will. When this switch is closed the pressure controlled switch of the spare tire is rendered operative to give a signal while the vehicle is standing still, so that if the spare tire is underinflated the driver may give it attention before starting on a trip. When switch S is closed, the signal system will also be set for action by any of the pressure controlled switches of the tires on the wheels to give a signal indicating a faulty inflated condition of a wheel tire or tires as soon as the vehicle is put in motion, and whether it is running forward or backward.

With this system it will be understood that each time a wheel carrying an underinflated or overinflated tire revolves the associated pressure switch will be operated to energize the circuit, causing the horn to give a short toot or tap and the lamp to flash. Such a signal is given whether the machine is moving forward or backing, and if more than one tire is affected a signal for each will be given, generally at different time periods, so that the driver will be advised of such fact. If, on the other hand, the spare tire should be in an underinflated condition a continuous signal will be given until the circuit is cut out or the tire defect corrected. The driver may thus at the start of a trip or at any time the vehicle is running test the condition of his wheel tires in a ready and convenient manner. The system also allows the operator to ascertain whether his spare tire is underinflated while the vehicle is running or while it is standing still, so that measures may be taken to put it in condition for immediate use if required.

The advantage of this system is that it is simple, reliable and efficient in use, and may be installed readily on any machine and kept in serviceable condition at a comparatively low cost. The switch S shown is one of a conventional type suitable for the purpose, but any other suitable type of switch may be used in its place.

From the foregoing description, taken in connection with the drawings, the construction and mode of operation of the system will be readily understood, and it will be seen that it provides a signal system having the advantages set forth and which will operate without causing wear on the tires or other parts of the machine. While the construction disclosed is preferred it will be understood, of course, that changes in the form, construction and arrangement of parts may be made, within the scope of the appended claims, without departing from the spirit or sacrificing any of the advantages of the invention.

I claim:

1. A tire pressure indicator comprising a housing having top and bottom walls, a flexible diaphragm disposed within the housing between said walls and adapted to be acted upon by air pressure in the tire, a reciprocable stem connected at one end to the diaphragm and extending at its opposite end outwardly through the top wall of the housing, an abutment on the outer end of the stem, means for holding the diaphragm and stem in normal position during predetermined pressures within the tire and permitting flexion of the diaphragm and effecting movement of the stem in one direction or the other when the tire pressure rises above or falls below a predetermined pressure, a support on the exterior of the housing, said means comprising a spring disposed between the diaphragm and top wall of the housing and acting on the diaphragm in opposition to the tire pressure and a spring disposed between the abutment and top wall of the housing and supplementing the tire pressure to act therewith in opposition to the pressure of the first named spring, and a bell crank lever pivoted to said support and having an arm pivoted to the outer end of the stem for actuation thereby and an arm positioned when the stem moves in one direction or the other to trip an indicating means.

2. A tire pressure indicator comprising a housing, a flexible diaphragm disposed within the housing and adapted to be acted upon by air pressure in the tire, a reciprocable stem connected at one end to the diaphragm and extending at its opposite end outwardly from the housing, means for holding the diaphragm and stem in normal position during predetermined pressures within the tire and permitting flexion of the diaphragm and effecting movement of the stem when the tire pressure varies from a predetermined pressure, a support on the exterior of the housing, a contact on the housing adapted to be engaged by the stem on a movement of the diaphragm to energize an indicating circuit, and a bell crank lever pivoted to said support and having an arm pivoted to the outer end of the stem for actuation thereby and an arm positioned when the stem moves to trip an indicating means.

3. A tire pressure indicator comprising a housing having top and bottom walls, a flexible diaphragm disposed within the housing between said walls and adapted to be acted upon by air pressure in the tire, a reciprocable stem connected at one end to the diaphragm and extending at its opposite end outwardly through the top wall of the housing, an adjustable abutment member on the outer end of the stem, means for holding the diaphragm and stem in normal position during predetermined pressures within the tire and permitting flexion of the diaphragm and effecting movement of the stem in one direction or the other when the tire pressure rises above or falls below a predetermined pressure, a support on the exterior of the housing, said means comprising a spring disposed between the diaphragm and top wall of the housing and acting on the diaphragm in opposition to the tire pressure and a spring disposed between the abutment and top wall of the housing and supplementing the tire pressure to act therewith in opposition to the pressure of the first named spring, and a bell crank lever pivoted to said support to swing in a vertical plane on a horizontal axis and having an arm pivoted to the outer end of the stem for actuation thereby and an arm positioned when the stem moves in one direction or the other to trip an indicating means.

References Cited in the file of this patent

UNITED STATES PATENTS

| Number | Name | Date |
|---|---|---|
| 1,765,213 | Depee | June 17, 1930 |
| 1,815,806 | Smith | July 21, 1931 |
| 2,043,277 | Woodberry | June 9, 1936 |
| 2,071,256 | Dobbs | Feb. 16, 1937 |
| 2,084,939 | Byron | June 22, 1937 |
| 2,183,089 | Bond | Dec. 12, 1939 |
| 2,296,411 | Wills | Sept. 22, 1942 |
| 2,308,372 | Krantz | Jan. 12, 1943 |
| 2,475,069 | Wood | July 5, 1949 |
| 2,481,864 | Peck | Sept. 13, 1949 |
| 2,593,824 | Wilson | Apr. 22, 1952 |